US012664300B2

(12) United States Patent
Chandrasekaran et al.

(10) Patent No.: US 12,664,300 B2
(45) Date of Patent: Jun. 23, 2026

(54) TRANSPARENT ENFORCEMENT OF APPLICATION-LEVEL ACCESS PRIVILEGES ON DATA STRUCTURES

(71) Applicant: SAP SE, Walldorf (DE)

(72) Inventors: Vengateswaran Chandrasekaran, Trichy (IN); Tomas Visnovec, Bratislava (SK); Lei Liu, Pezinok (SK); Sriram Narasimhan, Cedar Park, TX (US); Abhishek Reddy Komma, Chicago, IL (US)

(73) Assignee: SAP SE, Walldorf (DE)

( * ) Notice: Subject to any disclaimer, the term of this patent is extended or adjusted under 35 U.S.C. 154(b) by 23 days.

(21) Appl. No.: 18/918,256

(22) Filed: Oct. 17, 2024

(65) Prior Publication Data

US 2026/0111587 A1 Apr. 23, 2026

(51) Int. Cl.
*G06F 21/62* (2013.01)

(52) U.S. Cl.
CPC ............................... *G06F 21/6227* (2013.01)

(58) Field of Classification Search
CPC .................................................. G06F 21/6227
USPC ............................................................ 726/1
See application file for complete search history.

(56) References Cited

U.S. PATENT DOCUMENTS

| | | | | |
|---|---|---|---|---|
| 11,146,563 | B1 * | 10/2021 | Weintraub | H04L 63/20 |
| 2006/0167850 | A1 * | 7/2006 | Fish | G06F 21/6227 |
| 2013/0117313 | A1 * | 5/2013 | Miao | G06F 21/6245 |
| | | | | 707/E17.005 |
| 2015/0046318 | A1 * | 2/2015 | Shillig | G06Q 40/03 |
| | | | | 705/38 |
| 2017/0257379 | A1 * | 9/2017 | Weintraub | H04L 63/107 |
| 2018/0004970 | A1 * | 1/2018 | Arumugam | G06F 16/182 |
| 2020/0398859 | A1 * | 12/2020 | Borhan | F02D 41/0002 |
| 2022/0156262 | A1 * | 5/2022 | Chen | G06F 21/6227 |
| 2022/0407861 | A1 * | 12/2022 | Beecham | H04L 63/08 |
| 2024/0281556 | A1 * | 8/2024 | Thummala | G06F 21/6227 |

OTHER PUBLICATIONS

Help.Sap.com [online], "Examples: Securing Views Using SQL-Based Analytic Privileges" Mar. 2024, retrieved on Oct. 7, 2024, retrieved from URL <https://help.sap.com/docs/hana-cloud-database/sap-hana-cloud-sap-hana-database-security-guide/examples-securing-views-using-sql-based-analytic-privileges>, 8 pages.
Help.sap.com [online], "SQL Injection Prevention Functions" Mar. 2024, retrieved on Oct. 7, 2024, retrieved from URL <https://help.sap.com/docs/hana-cloud-database/sap-hana-cloud-sap-hana-sqlscript-reference/sql-injection-prevention-functions?q=SQL+injection>, 4 pages.

* cited by examiner

*Primary Examiner* — David P Zarka
(74) *Attorney, Agent, or Firm* — Fish & Richardson P.C.

(57) ABSTRACT

Methods, systems, and computer-readable storage media for receiving, from an application and during runtime of the application, a query including an artifact identifier that uniquely identifies an artifact, determining a data access privilege for a user with respect to the artifact, transmitting the query and the data access privilege to a data repository, the data repository inserting a filtering clause in the query to provide a modified query and retrieving data that is responsive to the modified query, and providing the data that is responsive to the modified query to the application.

17 Claims, 4 Drawing Sheets

1

TRANSPARENT ENFORCEMENT OF APPLICATION-LEVEL ACCESS PRIVILEGES ON DATA STRUCTURES

BACKGROUND

Software systems can be provisioned by software vendors to enable enterprises to conduct operations. Software systems can include various applications that provide functionality for execution of enterprise operations. Over the course of the execution of operations, data (often significant amounts of data) is generated and stored. The data can be subsequently analyzed and/or explored by users for a multitude of purposes, such as planning and executing enterprise operations. Typical environments accessed by users provide data analysis on pre-defined data domains available in the software systems or in a data warehouse and/or a data lake of the enterprise. For example, data can be stored within a data warehouse and/or data lake and can be accessible through data structures, such as online analytical processing (OLAP) models. In some examples, a data warehouse and/or a data warehouse enables different types of analytics to be executed over the data including, for example, dashboards, visualizations, big data processing, real-time analytics, and machine learning (ML).

SUMMARY

Implementations of the present disclosure are directed to data access control in accessing data stored in data repositories. More particularly, implementations of the present disclosure are directed to transparent enforcement of application-level access privileges on data structures.

In some implementations, actions include receiving, from an application and during runtime of the application, a query including an artifact identifier that uniquely identifies an artifact, determining a data access privilege for a user with respect to the artifact, transmitting the query and the data access privilege to a data repository, the data repository inserting a filtering clause in the query to provide a modified query and retrieving data that is responsive to the modified query, and providing the data that is responsive to the modified query to the application. Other implementations of this aspect include corresponding systems, apparatus, and computer programs, configured to perform the actions of the methods, encoded on computer storage devices.

These and other implementations can each optionally include one or more of the following features: actions further include populating a data structure using the data that is responsive to the modified query, the application executing actions using the data structure; the filtering clause includes a WHERE clause defining at least one value used to select the data retrieved from the data repository; the data access privilege is represented in a session variable of a session of the user and the application; determining a data access privilege for a user with respect to the artifact includes transmitting a request to a data access control (DAC) service, the request including a user identifier of the user and the artifact identifier of the artifact, the DAC service querying an authentication system, which returns the data access privilege; the data access privilege is determined from a policy that is defined for the artifact during a design-time; and the policy is provided by refining a base policy.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
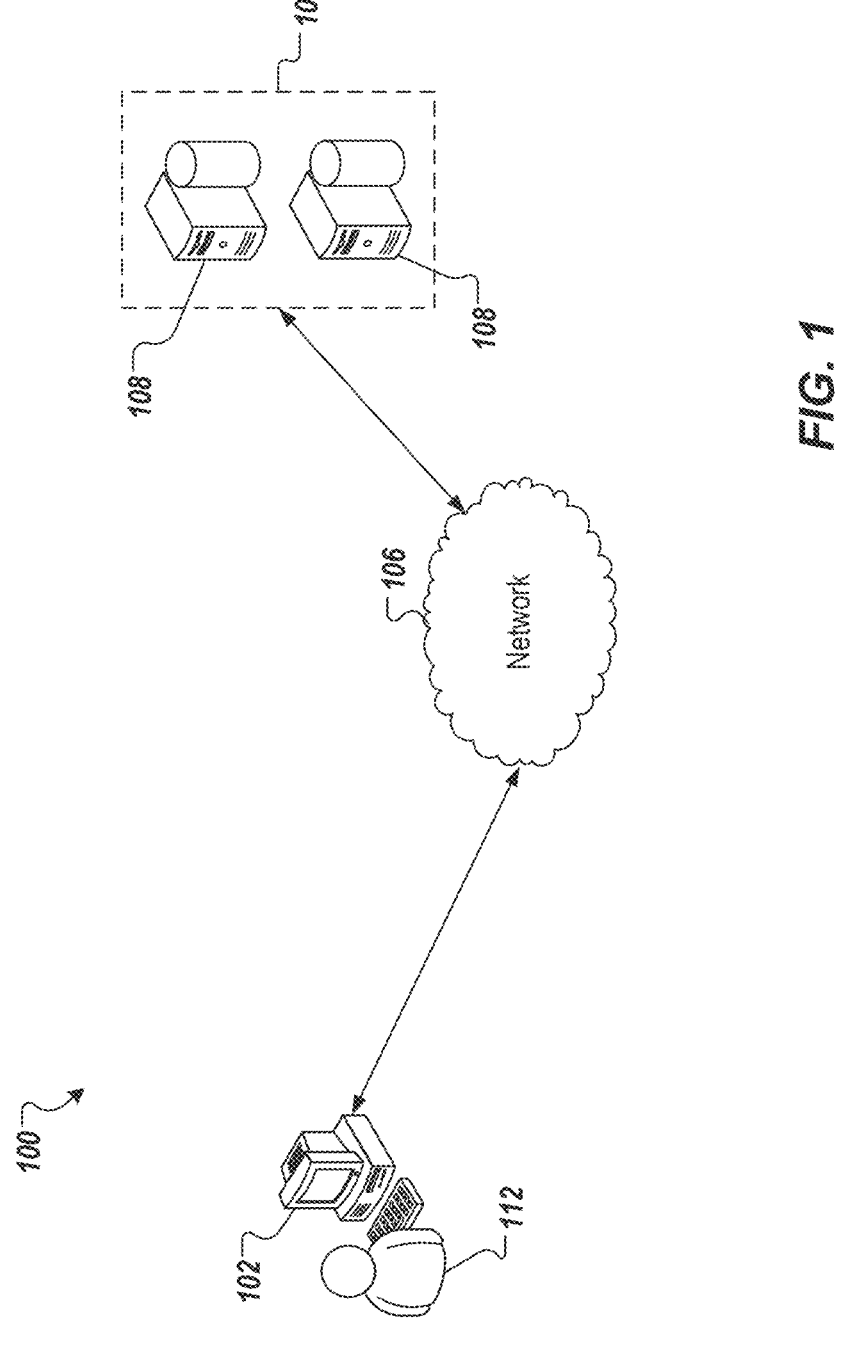
FIG. 1 depicts an example architecture that can be used to execute implementations of the present disclosure.

Implementations of the present disclosure are directed to data access control in accessing data stored in data repositories. More particularly, implementations of the present disclosure are directed to transparent enforcement of application-level access privileges on data structures. Implementations can include actions of receiving, from an application and during runtime of the application, a query including an artifact identifier that uniquely identifies an artifact, determining a data access privilege for a user with respect to the artifact, transmitting the query and the data access privilege to a data repository, the data repository inserting a filtering clause in the query to provide a modified query and retrieving data that is responsive to the modified query, and providing the data that is responsive to the modified query to the application.

To provide further context for implementations of the present disclosure, enterprises execute operations using software systems that generate and store data (often significant amounts of data). The data can be subsequently analyzed and/or explored by users for a multitude of purposes, such as planning and executing enterprise operations. For example, data repositories, such as data warehouses and data lakes, enable authorized users to access data. In general, a data lake can be described as storing raw data that can include unstructured data and structured data, and a data warehouse can be described as storing cleaned, processed, and structured data. Implementations of the present disclosure are described in further detail herein with reference to a data warehouse. It is contemplated, however, that implementations of the present disclosure can be realized using any appropriate form of data repository including, but not limited to, a data lake.

Data that is stored within a data warehouse can be accessible through one or more technologies, such as an online analytical processing (OLAP). In general, OLAP is optimized for querying and analyzing large volumes of data to support, for example, decision-making processes, complex analytical and reporting tasks, and provides relatively fast and computationally efficient access to aggregated data. OLAP systems enable performance of various activities, such as multidimensional analysis, trend analysis, and advanced data exploration. In using OLAP, data is accessible through a data cube (or hypercube), which can be described as a multi-dimensional array of data that enables time- and resource-efficient analysis of data stored in relational databases. In general, a data cube is populated using database views on top of underlying data set(s) stored within a database (e.g., a relational database).

Access to data can be limited based on privileges that can be implemented through, for example, an access control list (ACL). For example, a user can log into an application (e.g., an analytics application) and, based on a role of the user and/or a group that the user is associated with, the user is granted access to certain data in view of one or more policies (e.g., the user can access a data object, but only for specified values of one or more fields). More particularly, a privilege can enable a user access to certain data in the data cube (e.g., for a first value of a field), but prevent the user from accessing other data in the data cube (e.g., for a second value of the field). However, privileges to data populating data cubes follow an all or nothing approach. That is, each user is granted access to all data in the data cube or no data in the data cube. Further, different privileges (e.g., which data field(s) and/or which row(s) a user can access) are defined and/or can change after the data cubes are deployed.

Consequently, a problem arises in how to enforce application-level privileges on data structures, such as data cubes. For example, how to pass runtime access privileges to the underlying facts (data values) and dimensions (data fields) on which the data cube is built and still have the data cube only show the data that the user is allowed to see based on the runtime access privileges.

In view of the above context, implementations of the present disclosure provide for transparent enforcement of application-level access privileges on data structures, such as data cubes. As described in further detail herein, implementations of the present disclosure provide one or more filtering conditions that are passed at the application layer at runtime. Here, runtime can refer to user interaction with an application (e.g., analytics application) to perform one or more actions (e.g., analytics) on data stored in a database. In some implementations, data that is retrieved from the database and is used to populate the data cube, on which the one or more actions are to be executed, is prefiltered based on the access privileges determined at runtime (e.g., based on the user logging into the application). In this manner, the data cube is only populated with data that the user has access privileges for.

Implementations of the present disclosure are described in further detail herein with non-limiting reference to example applications, products, systems, components, and the like, that are provisioned by SAP SE of Walldorf, Germany. It is contemplated, however, that implementations of the present disclosure can be realized with any appropriate applications, products, systems, components, and the like.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host a data repository (e.g., a data warehouse) that stores data that can be accessed by users, such as the user 112. For example, the user 112 can log into an application (e.g., an analytics application hosted in the server system 104) using the client device 102 to interact with data stored within the data repository. In some examples, the data repository ensures tenant separation of data stored therein. Here, a tenant can refer to an enterprise that stores its data within a data repository provisioned by a service provider (e.g., SAP SE). Tenant separation ensures enterprises do not have access to each other's data.

In general, data is transferred from one or more source applications (e.g., an application in which the data was input and/or generated) to the data repository, is transformed (denormalized) and is stored as one or more data products (e.g., in an object store of the data repository) for subsequent consumption through one or more applications (e.g., the analytics application that the user 112 interacts with). In accordance with implementations of the present disclosure, and as described in further detail herein, consumption of the data by users, such as the user 112, is controlled, such that users are only allowed to access data specified by policies implemented by respective tenants. For example, access privileges enable users to only see data analysis on data related to defined cost centers, regions, departments, assignments, and the like.

In some implementations, multiple phases can be considered and can include a design-time and a runtime. In some examples, design-time refers to activities that are performed prior to execution of an application for consumption of data from a data repository. In some examples, runtime refers to activities that are performed during execution of an application for consumption of data from the data repository.

Example design-time activities can include, but are not limited to, defining one or more data models that are implemented as data cubes and defining one or more policies that define access control privileges. For example, and in the context of analytics, a data product owner (e.g., an agent of an enterprise that is responsible for data products) models analytical entities as fact and dimension joins. In some examples, modeling is executed using Core Data Services (CDS) provided by SAP SE to provide data cubes as CDS models. In some examples, CDS models are provided using a schema notation, referred to as a core schema notation (CSN), which is an open specification derived from the Javascript object notation (JSON) schema. CDS models can be described as plain JavaScript objects that comply with CSN.

For purposes of non-limiting illustration, an example model can include an invoice data set. In some examples, the model is defined as a set of tables and can include a star schema of facts and dimensions, where a fact table is provided as a denormalized (plain table) model. In the example invoice data set, an invoice table (InvoiceLines), a supplier table (Supplier), and a cost center table (CostCenter) can be considered. In some examples, InvoiceLines includes an identifier (as a primary key (PK)), supplier (from Supplier), cost center (from CostCenter), line number (LineNum, as an integer), amount (Amount, as a decimal value, and currency code (CurrencyCode, as a string). In some examples, an exposure model can be provided that can be referred to as a protected data set and can include a denormalized view (structured query language (SQL) view) of facts and dimensions. Continuing with the example above, an example view can be provided as:

---

<<view>> InvoiceLines_Protected

+id: PK
+Supplier_ID: string
+Supplier_Name: string
+Supplier_Country: string
+CostCenter_ID: string
+CostCenter_Name: string
+LineNum: integer
+Amount: decimal
+CurrencyCode: string

---

With regard to policies, the data product owner can define a set of base policies (e.g., using CDS annotations) to define entities and attributes that data access controls can be applied to. In some examples, the base policies can be refined by, for example, adding restriction value(s) and/or combining multiple base policies. Each policy can be assigned to users for evaluation of the policy during runtime. In some examples, policies can be assigned to individual users (e.g., based on user identifiers), on roles (e.g., roles that users are assigned to), and/or groups (e.g., groups that users are associated with).

With reference to the non-limiting example of InvoiceLines, an example base policy can be provided using the following example annotations:

--- annotate InvoiceLines with @ams: CurrencyCode
annotate InvoiceLines with @restrict: grant READ to InvoiceLinesPolicy

---

The example annotations define a policy for granting read access to users based on CurrencyCode. In this manner, during runtime, users can be granted read access to data based on CurrencyCode.

After design-time, database artifacts and access control artifacts can be generated as part of continuous integration and continuous development (CI/CD) of regular release cycles. CI can be described as a development process, in which developers integrate their respective contributions frequently into a single main line, and, before each integration, the changes are verified through builds and automated testing. CD can be described as expanding on CI in that any changes that successfully pass testing are automatically deployed to the production (runtime) environment.

An example database artifact can include a database schema. In view of the non-limiting example of InvoiceLines, an example database schema can include:

---

SCHEMA InvoiceLines:
CurrencyCode: string

---

In some examples, the database artifacts are deployed to the data repository.

Example access control artifacts can include a base policy (e.g., provided from the annotations), a structured privilege artifact, and a condition artifact. In view of the non-limiting example of InvoiceLines, examples of a base policy, a structured privilege artifact, and a condition artifact can respectively include:

---

POLICY InvoiceLinesPolicy
GRANT READ ON "InvoiceLines"
WHERE CurrencyCode IS NOT RESTRICTED
STRUCTURED PRIVILEGE INVOICELINES_SPR
FOR SELECT ON "InvoiceLines"
CONDITION PROVIDER INVOICELINES_CPR
CONDITION PROVIDER INVOICELINES_CPR

---

The access control artifacts are deployed to an authorization management service (AMS), which stores policies and maps policies to users, roles, and/or groups (e.g., in an ACL).

In some implementations, prior to runtime, a base policy is refined to provide a refined policy. For example, an administrator of an enterprise (a tenant) can refine a base policy to provide a refined policy that is applied for a particular use case. In view of the non-limiting example of InvoiceLines and the example base policy provided above, example refined policies can include:

---

GRANT READ ON "InvoiceLines" WHERE CurrencyCode = EUR
GRANT READ ON "InvoiceLines" WHERE CurrencyCode = USD

---

In some examples, the refined policy for EUR can be applied to users located in Europe and the refined policy for USD can be applied to users located in the United States.

At runtime, a user can log into an application using credentials that enable the user to be authenticated. During runtime, the user can query the data repository to perform actions on data, such as running analytics over data. For example, and as described in further detail herein, the user can submit a query through an application, data access privileges of the user can be checked, the query can be modified in response to the data access privileges to provide a modified query, and data can be retrieved from a database using the modified query. In some examples, the data is used to populate a data structure, such as a data cube, that actions can be executed on (e.g., analytics can be executed using the (populated) data structure.

Figure 2:
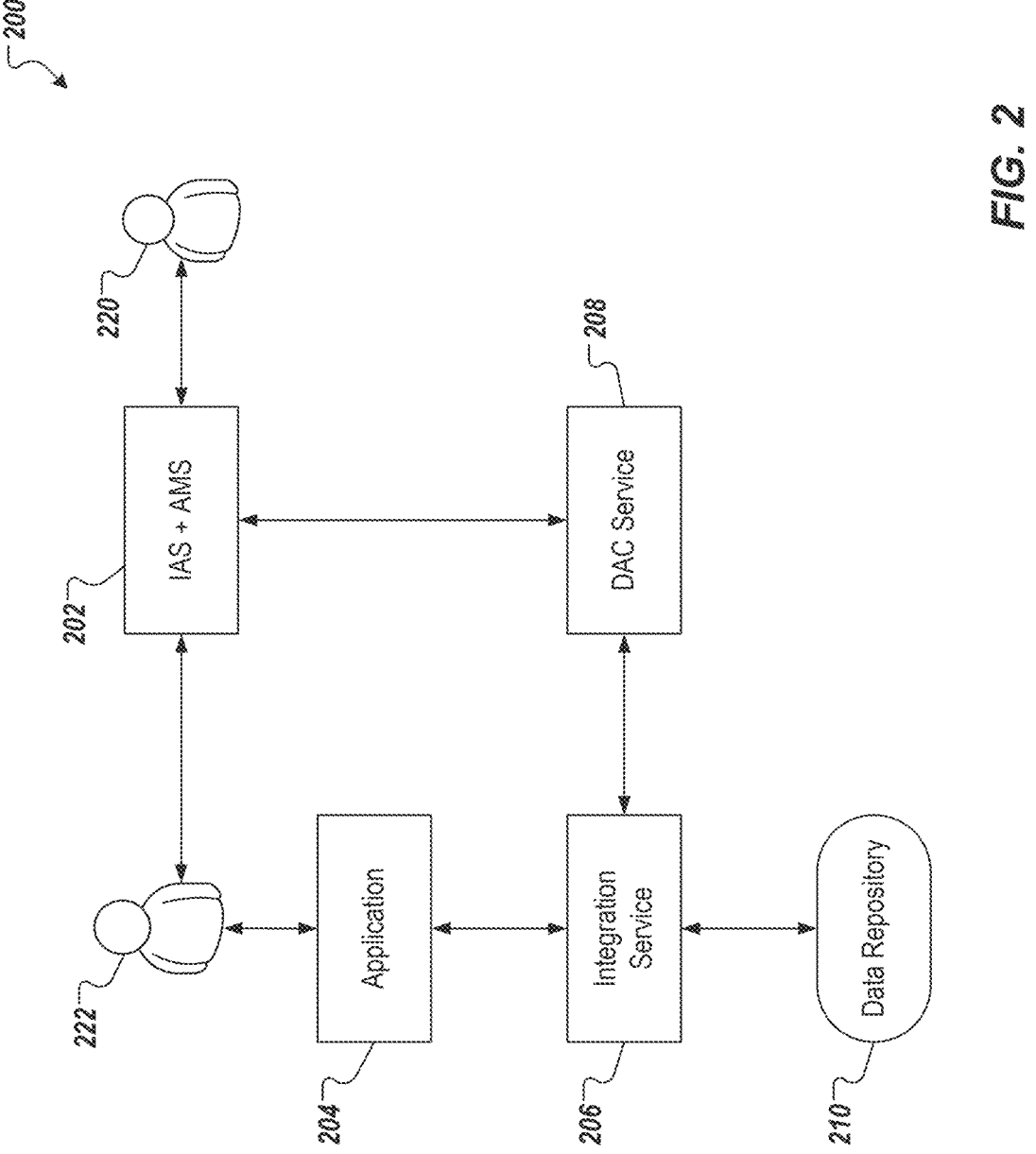
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes an authentication system 202, an application 204, an integration service 206, a data access control (DAC) service 208, and a data repository 210. In some examples, the authentication system 202 includes an identity authentication service (IAS) and an AMS provided by, for example, SAP SE. In some examples, the application 204 includes an analytics application, such as part of SAP Analytics Cloud (SAC) provided by SAP SE. In some examples, the DAC service 208 can include one or more of an application and a permission application programming interface (API). In some examples, the DAC service 208 is at least partially provided using a sidecar open policy agent (OPA) server that is implemented by the AMS of the authentication system 202.

The example of FIG. 2 includes a user 220 and a user 222. The user 220 can include an administrator that refines base policies and assigns (refined) policies to users, roles, and/or groups. For example, and as described herein, a base policy can be provided (e.g., by a data product owner) that the user 220 can refine and assign to be applied to the user 222 during runtime. With non-limiting reference to the examples above, the user 220 can refine the base policy to provide the (refined) policy of GRANT READ ON "InvoiceLines" WHERE CurrencyCode=EUR, and can assign the policy for application to the user 222 (e.g., by user identifier, role, group).

The user 222 can include an agent of an enterprise that seeks access to data of the enterprise that is stored in the data repository 210. In some examples, the user 222 can have authentication credentials established with the authentication system 202 and can log into the application 204 using the authentication credentials. In some examples, logging into the application 204 results in creation of a session (runtime session), during which the user 222 can interact with the application 204 (e.g., to execute analytics over data). A session can include a set of session variables to store information to be used across multiple interactions of the user 222 with the application 204. As such, the session variables can provide a sort of memory of interactions and information during the session. In some examples, the session ends when the user 222 logs out of the application 204.

In some examples, interactions of the user 222 with the application 204 can result in a query for data being generated by the application 204. For purposes of non-limiting illustration, an example query can include:

SELECT*FROM InvoiceLines

In this example, the query identifies the artifact InvoiceLines. In some implementations, the application 204 passes the query and a user identifier to the integration service 206.

In some examples, the integration service 206 can determine whether data access privileges for the user 222 or for the user 222 and artifact have been retrieved. For example, the integration service 206 can determine whether session variables indicate that privileges for the user 222 or for the user 222 and artifact have been retrieved. If privileges for the user 222 or for the user 222 and artifact have not been retrieved, the integration service 206 submits a request for privileges from the DAC service 208. In some examples, the request includes an artifact identifier that identifies a data object and a user identifier that identifies the user 222 (e.g., a user identifier that is used to authenticate the user). For purposes of non-limiting illustration, an example artifact identifier can include InvoiceLines.

In some implementations, the DAC service 208 receives the request and queries the authentication system 202 for privileges of the user 222. In some examples, a query to the authentication system 202 can include the user identifier and, in response to the query, the authentication system 202 returns all privileges assigned to the user 222 (e.g., for all artifacts). In some examples, a query to the authentication system 202 can include the user identifier and the artifact identifier and, in response to the query, the authentication system 202 returns privileges of the user 222 with respect to the artifact. For purposes of non-limiting illustration, an example privilege can include "InvoiceLines": CurrencyCode='EUR'.

In some implementations, the DAC service 208 instructs the integration service 206 to append one or more filtering snippets to the session based on the privileges returned from the authentication system 202. In some examples, a filtering snippet can be appended to the session in a session variable. For purposes of non-limiting illustration, an example filtering snippet can be provided based on the privilege "Invoice-Lines": CurrencyCode='EUR' and can be appended to the session as a session variable. In this manner, and for the remainder of the session, privileges represented in session variables can be applied, as described herein.

In some implementations, the integration service 206 submits the query to the data repository 210 with any session variables. In some examples, the data repository 210 process any session variables representative of privileges to provide a modified query. For example, for a session variable representative of a privilege, the query is modified to include a filtering clause (e.g., a WHERE clause). For purposes of non-limiting illustration, an example modified query can include:

SELECT*FROM InvoiceLines WHERE CurrencyCode='EUR'

In this example, the query is modified to include the WHERE clause (filtering clause) responsive to the privilege "InvoiceLines": CurrencyCode='EUR'. The data repository 210 processes the modified query to retrieve data that is responsive thereto and a query result can be passed back to the application 204 through the integration service 206. In some examples, the data that is retrieved from tables is used to populate a data cube (OLAP cube) in a data lake.

Figure 3:
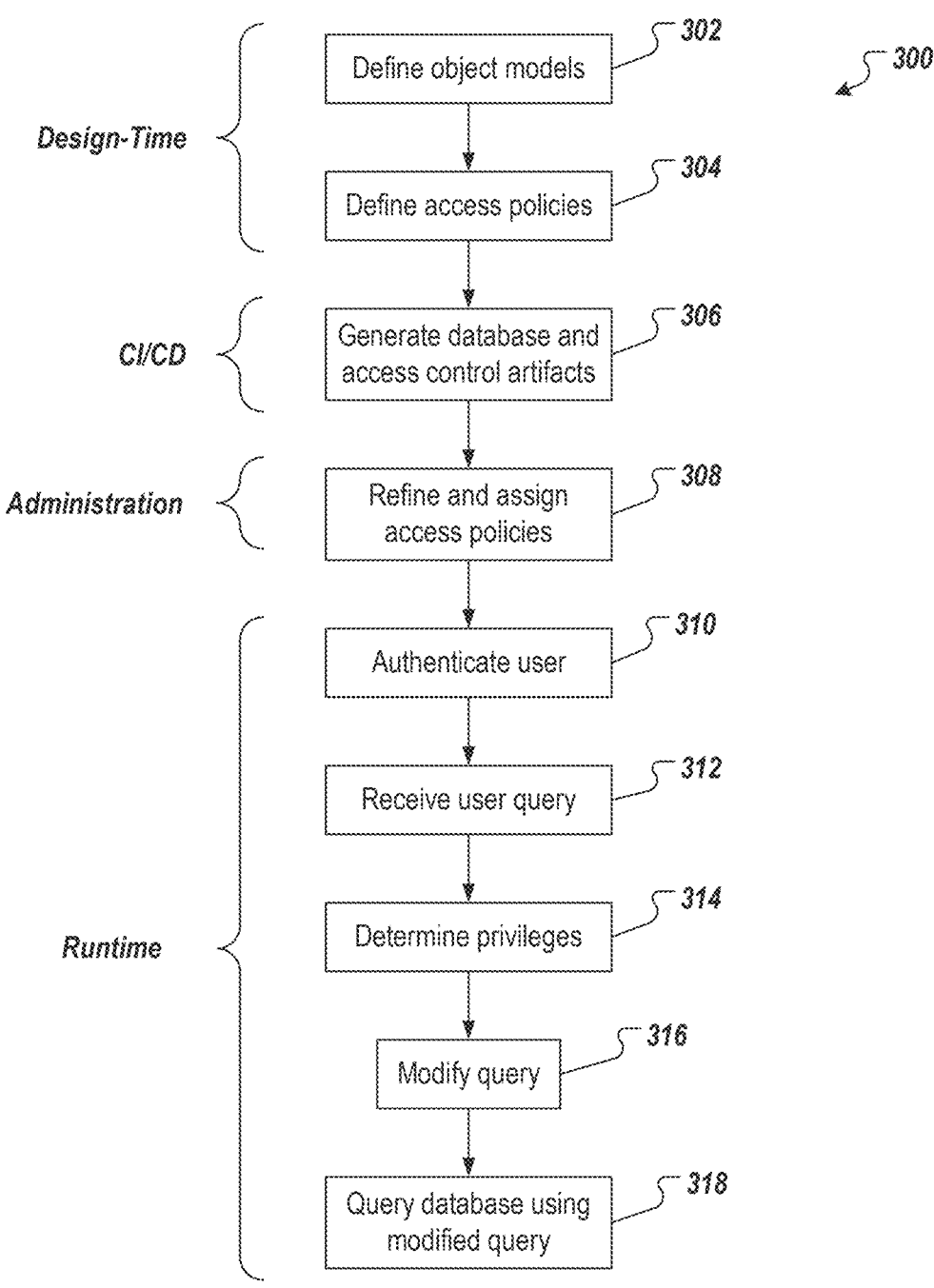
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

One or more object models and access policies are defined (302, 304). For example, and as described herein, a data product owner (e.g., an agent of an enterprise that is responsible for data products) models (e.g., using CDS) analytical entities as fact and dimension joins and can define a set of base policies (e.g., using CDS annotations) to define entities and attributes that data access controls can be applied to. Database and access control artifacts are generated (306). For example, and as described herein, database artifacts and access control artifacts can be generated as part of CI/CD in regular release cycles. One or more access policies are refined and assigned (308). For example, and as described herein with reference to FIG. 2, the user 220 can refine base policies and assign (refined) policies to users, roles, and/or groups. For example, a base policy can be provided (e.g., by a data product owner) that the user 220 can refine and assign to be applied to the user 222 during runtime.

A user is authenticated (310). For example, and as described herein, the user 222 can have authentication credentials established with the authentication system 202 and can log into the application 204 using the authentication credentials and a session (runtime session) can be created, during which the user 222 can interact with the application 204 (e.g., to execute analytics over data). A query is received (312). For example, and as described herein, interactions of the user 222 with the application 204 can result in a query for data being generated by the application 204.

Data access privileges are determined (314). For example, and as described herein, the integration service 206 can determined whether any session variables represent privileges for access to data values for any artifact identified in the query. For example, the integration service 206 can determine whether session variables indicate that privileges for the user 222 or for the user 222 and artifact have been retrieved. If privileges for the user 222 or for the user 222 and artifact have not been retrieved, the integration service 206 submits a request for privileges from the DAC service 208. In some examples, the request includes an artifact identifier that identifies a data object and a user identifier that identifies the user 222 (e.g., a user identifier that is used to authenticate the user).

The query is modified (316). For example, and as described herein, the integration service 206 submits the query to the data repository 210 with any session variables. In some examples, the data repository 210 process any session variables representative of privileges to provide a modified query. For example, for a session variable representative of a privilege, the query is modified to include a filtering clause (e.g., a WHERE clause). The data repository is queried using the modified query (318). For example, and as described herein, the data repository 210 processes the modified query to retrieve data that is responsive thereto and a query result can be passed back to the application 204 through the integration service 206.

Figure 4:
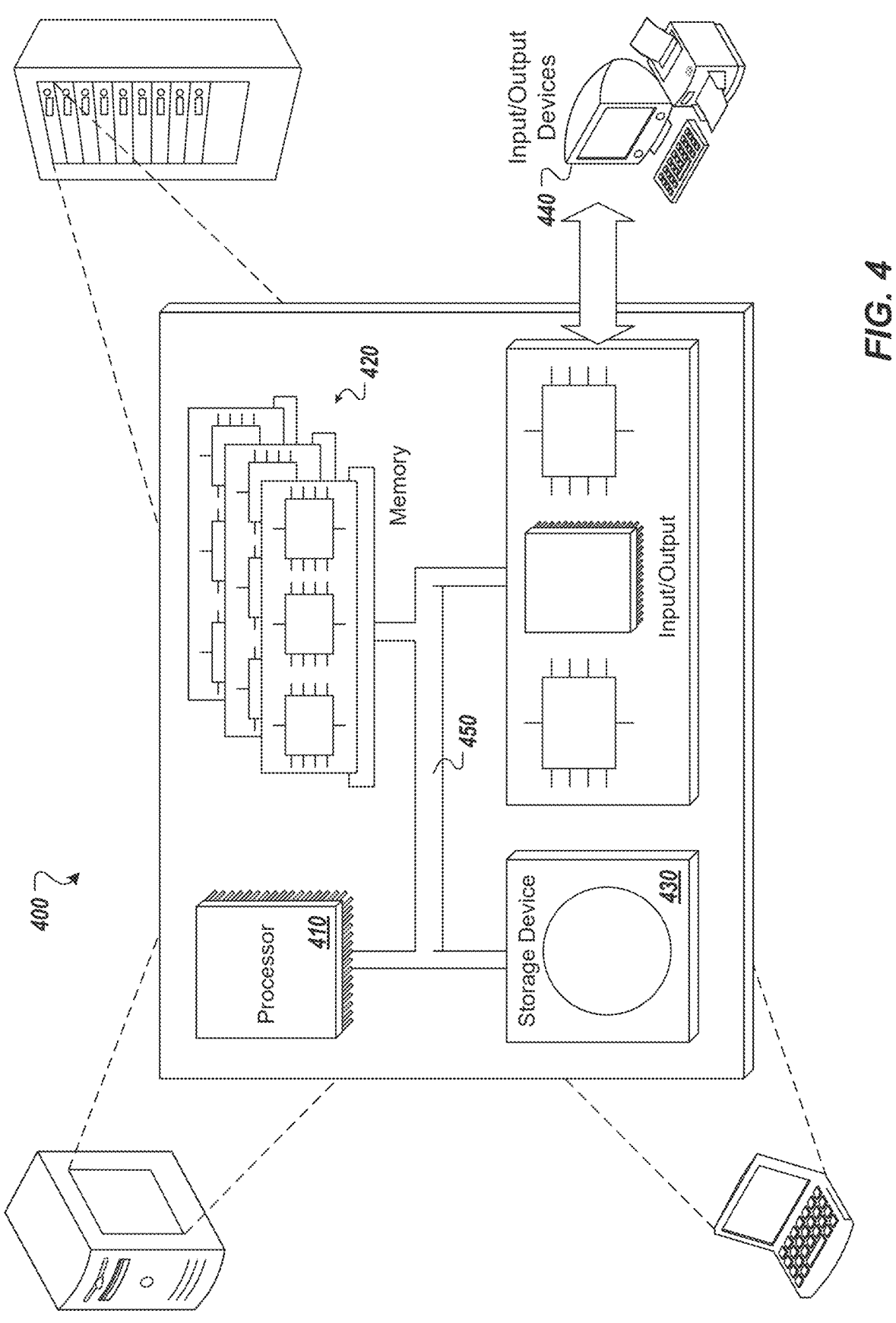
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for runtime enforcement of application-level data access controls in querying data structures, the method being executed by one or more processors and comprising:

receiving, from an application and during runtime of the application, a query comprising an artifact identifier that uniquely identifies an artifact;

determining a data access privilege for a user with respect to the artifact by transmitting a request to a data access control (DAC) service, the request comprising a user identifier of the user and the artifact identifier of the artifact, the DAC service querying an authentication system, which returns the data access privilege;

transmitting the query and the data access privilege to a data repository, the data repository inserting a filtering clause in the query to provide a modified query and retrieving data that is responsive to the modified query; and providing the data that is responsive to the modified query to the application.

2. The method of claim 1, further comprising populating a data structure using the data that is responsive to the modified query, the application executing actions using the data structure.

3. The method of claim 1, wherein the filtering clause comprises a WHERE clause defining at least one value used to select the data retrieved from the data repository.

4. The method of claim 1, wherein the data access privilege is represented in a session variable of a session of the user and the application.

5. The method of claim 1, wherein the data access privilege is determined from a policy that is defined for the artifact during a design-time.

6. The method of claim 5, wherein the policy is provided by refining a base policy.

7. A non-transitory computer-readable storage medium coupled to one or more processors and having instructions stored thereon which, when executed by the one or more processors, cause the one or more processors to perform operations for enforcement of application-level data access controls in querying data structures, the operations comprising:

receiving, from an application and during runtime of the application, a query comprising an artifact identifier that uniquely identifies an artifact;

determining a data access privilege for a user with respect to the artifact by transmitting a request to a data access control (DAC) service, the request comprising a user identifier of the user and the artifact identifier of the artifact, the DAC service querying an authentication system, which returns the data access privilege;

transmitting the query and the data access privilege to a data repository, the data repository inserting a filtering clause in the query to provide a modified query and retrieving data that is responsive to the modified query; and providing the data that is responsive to the modified query to the application.

8. The non-transitory computer-readable storage medium of claim 7, wherein operations further comprise populating a data structure using the data that is responsive to the modified query, the application executing actions using the data structure.

9. The non-transitory computer-readable storage medium of claim 7, wherein the filtering clause comprises a WHERE clause defining at least one value used to select the data retrieved from the data repository.

10. The non-transitory computer-readable storage medium of claim 7, wherein the data access privilege is represented in a session variable of a session of the user and the application.

11. The non-transitory computer-readable storage medium of claim 7, wherein the data access privilege is determined from a policy that is defined for the artifact during a design-time.

12. The non-transitory computer-readable storage medium of claim 11, wherein the policy is provided by refining a base policy.

13. A system, comprising:

a computing device; and a computer-readable storage device coupled to the computing device and having instructions stored thereon which, when executed by the computing device, cause the computing device to perform operations for enforcement of application-level data access controls in querying data structures, the operations comprising:

receiving, from an application and during runtime of the application, a query comprising an artifact identifier that uniquely identifies an artifact;

determining a data access privilege for a user with respect to the artifact by transmitting a request to a data access control (DAC) service, the request comprising a user identifier of the user and the artifact identifier of the artifact, the DAC service querying an authentication system, which returns the data access privilege;

transmitting the query and the data access privilege to a data repository, the data repository inserting a filtering clause in the query to provide a modified query and retrieving data that is responsive to the modified query; and providing the data that is responsive to the modified query to the application.

14. The system of claim 13, wherein operations further comprise populating a data structure using the data that is responsive to the modified query, the application executing actions using the data structure.

15. The system of claim 13, wherein the filtering clause comprises a WHERE clause defining at least one value used to select the data retrieved from the data repository.

16. The system of claim 13, wherein the data access privilege is represented in a session variable of a session of the user and the application.

17. The system of claim 13, wherein the data access privilege is determined from a policy that is defined for the artifact during a design-time.

\* \* \* \* \*